US008897243B2

(12) United States Patent
Li et al.

(10) Patent No.: US 8,897,243 B2
(45) Date of Patent: Nov. 25, 2014

(54) METHOD FOR SCHEDULING USER EQUIPMENT IN A RADIO COMMUNICATIONS SYSTEM AND APPARATUS THEREOF

(75) Inventors: Lei Li, Beijing (CN); Xing Lin Wang, Beijing (CN); Xiao Kun Yang, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 172 days.

(21) Appl. No.: 13/577,014

(22) PCT Filed: Feb. 5, 2010

(86) PCT No.: PCT/CN2010/000159
§ 371 (c)(1),
(2), (4) Date: Dec. 4, 2012

(87) PCT Pub. No.: WO2011/094895
PCT Pub. Date: Aug. 11, 2011

(65) Prior Publication Data
US 2013/0070695 A1    Mar. 21, 2013

(51) Int. Cl.
*H04W 4/00*   (2009.01)
*H04W 72/00*  (2009.01)
*H04W 72/04*  (2009.01)
*H04W 72/08*  (2009.01)

(52) U.S. Cl.
CPC ............ *H04W 72/00* (2013.01); *H04W 72/046* (2013.01); *H04W 72/0466* (2013.01); *H04W 72/082* (2013.01)
USPC ........................................................ 370/329

(58) Field of Classification Search
USPC ................................................ 370/329, 330
See application file for complete search history.

(56) References Cited

U.S. PATENT DOCUMENTS

| 2005/0285788 A1 | 12/2005 | Xin ................................ 342/432 |
| 2007/0274256 A1* | 11/2007 | Murai et al. .................. 370/328 |
| 2009/0059844 A1* | 3/2009 | Ko et al. ........................ 370/328 |
| 2011/0135033 A1* | 6/2011 | Ko et al. ........................ 375/295 |

FOREIGN PATENT DOCUMENTS

| CN | 101335970 A | 12/2008 |
| CN | 101345975 A | 1/2009 |
| WO | WO-2010/013751 A | 2/2010 |

OTHER PUBLICATIONS

Wireless Communications and Networking Conference, 2007 (WCNC 2007) IEEE, Mar. 15, 2007, Low Complex User Selection Strategies for Multi-user MIMO Downlink Scenario (6 pages).
R1-070199, 3GPP TSG-RAN WG1 #47bis, Sorrento, Italy, Jan. 15-19, 2007, "UE Paring for E-UTRA Uplink Multiuser MIMO", ZTE, 5 pgs.

* cited by examiner

*Primary Examiner* — Gary Mui
(74) *Attorney, Agent, or Firm* — Harrington & Smith

(57) ABSTRACT

Method and Apparatus for scheduling transmissions of a plurality of user equipments in a radio communications system including the steps of: transmitting by at least two user equipments of said plurality, of channel information to an access node, said access node serving said at least two user equipments, wherein said channel information includes of a channel matrix; said access node upon reception of said channel information, determining a correlation between said at least two user equipments; said access node comparing said determined correlation to a threshold, and said access node scheduling radio resources for said at least two user equipments based on said comparison.

20 Claims, 4 Drawing Sheets

FIG 3

UL scheduling algorithm

For $i$ = user 1 : user M

{ apply SVD;
        arrange the singular values in descending order;
        arrange the right singular vectors accordingly;
        }

For any two users $i$, $j$

{set $r_{min}$=min (rank (H($i$)); rank (H($j$)));
        calculate $||U(i)_{min} U(i)^H{}_{min} - U(j)_{min} U(j)^H{}_{min}||_F$ If $||U(i)_{min} U(i)^H{}_{min} - U(j)_{min} U(j)^H{}_{min}||_F \geq \varepsilon$ {put user $i$, $j$ into one resource (frequency-time) block;} else

{put user $i$, $j$ into different resource (frequency-time) blocks;}
        }

FIG 4

DL scheduling algorithm

For i = user 1 : user M
    { apply SVD;
    arrange the singular values in descending order:
    arrange the left singular vectors accordingly;
    }

For any two users i , j
    {set $r_{min}$=min (rank (H(i)); rank (H(j)));
    calculate $\|V(i)_{min} V(i)^H_{min} - V(j)_{min} V(j)^H_{min}\|_F$
    If $\|V(i)_{min} V(i)^H_{min} - V(j)_{min} V(j)^H_{min}\|_F \geq \varepsilon$
        {put user i, j into one resource (frequency-time) block;}
    else
        {put user i, j into different resource (frequency-time) blocks;}
    }

METHOD FOR SCHEDULING USER EQUIPMENT IN A RADIO COMMUNICATIONS SYSTEM AND APPARATUS THEREOF

FIELD OF THE INVENTION

The invention is used in radio communications systems to ensure that ANs (Access Nodes) can ensure a proper scheduling of radio resources for UEs (User Equipments) present in a radio communications system.

SUMMARY OF THE INVENTION

In current radio communications systems, such as LTE (Long Term Evolution), LTE-A (Long Term Evolution—Advanced), UMTS (Universal Mobile Telecommunications System) or WiMAX (Worldwide Interoperability for Microwave Access), MIMO (multiple input multiple output) technologies, that is the use of multiple antennas, play an important role on the air-interface as it permits such radio communications systems to increase their system capacity.

FIG. 1 illustrates such a radio communications system 1000 comprising of a number of access nodes (ANs) 100 which divide system 1000 into cells and a plurality of user equipments (UEs) 10. In such systems 1000, ANs 100 can be at least one of the following: a base station (BS), a BSC (Base station controller), a RNC (radio network controller), an e-NB (e-nodeB), a RBS (radio base station), a HeNB (Home-evolved NodeB), while UEs 10 can be at least one of the following: a mobile telephone (MT), a portable computer (PC), a laptop, a cellular telephone, a portable internet device, a mobile station (MS).

While ANs 100 have the physical space and the processing capabilities to handle multiple antennas, UEs 10 have both limited space and low processing capabilities due to their size. Typically a UE 10 has no more than two antennas. This limited antenna number reduces MIMO performance in system 1000.

In order to overcome the reduction in MIMO performance, MU-MIMO (Multi-User MIMO), also known as virtual-MIMO, has been proposed. MU-MIMO, allows multiple UEs 10 with an antenna to operate on the same resource block, the resource block being a frequency resource block or a time resource block. However, a large number of such UEs 10 can exhaust the available resources of an AN 100 and increase system capacity. This can be overcome through the use of SDMA (Space Division Multiple Access).

However, in SDMA the channels used by UEs 10 are not completely orthogonal to each other as in the case of TDMA (Time Division Multiple Access) and FDMA (Frequency Division Multiple Access). This can generate interference to UE transmissions within the radio communications system 1000. In practise, in order to reduce the interference generated, ANs having directional antennas with narrow beamwidth are used with SDMA. However, narrow beamwidth antennas are not suitable for radio access, and UEs have to locate at different directions in order to utilise the directional beam of the antennas. This in turn, reduces the efficiency and performance of the radio communications system as it is not easy for UEs to gain access to It is therefore necessary for an AN 100 to schedule and assign radio resources such as resource blocks accordingly, so that interference can be reduced and without causing accessing problems to UEs 10.

3GPP R1-051422 proposes an orthogonal UE pairing approach for scheduling radio resources, while 3GPP R1-070199 proposes an adjustable determinant pairing approach for scheduling radio resources.

However, the mechanisms proposed above, are designed for radio communications systems, having ANs 100 with two antennas and UEs 10 having each one antenna. Such mechanisms can not be extended to other type of MIMO deployments. In LTE-A radio systems where diverse MIMO deployments are envisaged, mechanisms designed for ANs 100 having four antennas and UEs 10 having each two antennas are required. In addition, ANs 100 require a lot of information from a UE 10 in order to be able to schedule radio resources, for example the full channel matrix information from the UE 10. In a FDD (Frequency Division Duplex) system it is not feasible to provide such a large amount of data to the AN 100, while a large amount of information will increase the amount of processing that an AN 100 needs to do, which in turn will increase the time before radio resources can be scheduled. This delay can further reduce radio communications system's overall efficiency. Moreover, both proposed mechanisms only deal with scheduling in the uplink direction without considering scheduling radio resources in the downlink direction.

A need therefore exists for a technique that can reduce the amount of calculations required, be precise and reduce the amount of feedback necessary in order to schedule transmissions within a radio communications system.

With the present invention, the above mentioned issues are resolved and an efficient technique reducing user interference is implemented. The technique is achieved by the teachings contained in the independent claims.

According to the independent method claim, a method is provided for scheduling transmissions of a plurality of user equipments in a radio communications system. The method comprising the steps of:
- transmitting by at least two user equipments of said plurality, of channel information to an access node, said access node serving said at least two user equipments, wherein said channel information comprises of a channel matrix;
- said access node upon reception of said channel information, determining a correlation between said at least two user equipments;
- said access node comparing said determined correlation to a threshold, and
- said access node scheduling radio resources for said at least two user equipments based on said comparison.

According to the independent apparatus claim, an access node having means adapted for scheduling transmissions of a plurality of user equipments in a radio communications system. The access node comprises:
- transceiver means adapted to receive channel information transmitted by at least two user equipments of said plurality, said at least two user equipments being served by said access node, wherein said channel information comprises of a channel matrix;
- determining means adapted to determine a correlation between said at least two user equipments;
- comparing means adapted to compare said determined correlation to a threshold, and
- scheduling means adapted to schedule radio resources for said at least two user equipments based on said comparison.

Advantageous embodiments of the present invention are described by the dependent claims, wherein:

Upon the correlation being equal to the threshold or higher than the threshold, the at least two user equipments are scheduled by the access node to use the same radio resources.

Upon the correlation being lower than the threshold, the at least two user equipments are scheduled by the access node to use different radio resources. In both cases the radio resources are divided into blocks, thus permitting ease of allocation.

The correlation is determined using subspace analysis spanning the channel matrices. The subspace analysis is applied to rows and columns of the channel matrices. Moreover, the correlation is determined for an uplink channel and/or a downlink channel of said at least two user equipments.

It is further pointed out that the invention may be realized by means of a computer program respectively software. According to a further refinement of the invention there is provided a computer-readable medium on which there is stored a computer program element for executing the steps of the method claim 1.

The program may be implemented as a computer readable instruction code in any suitable programming language, such as, for example, JAVA, C++, and may be stored on a computer-readable medium (removable disk, volatile or non-volatile memory, embedded memory/processor, control processor etc.). The instruction code is operable to program a computer or any other programmable device to carry out the intended functions. The program element may be available from a network, such as the World Wide Web, from which it may be downloaded.

Furthermore, the invention may also be realized by means of one or more specific electronic circuits respectively hardware. Furthermore, the invention may also be realized in a hybrid form, i.e. in a combination of software modules and hardware modules.

The computer-readable medium may be readable by a computer or a processor. The computer-readable medium may be, for example but not limited to, an electric, magnetic, optical, infrared or semiconductor system, device or transmission medium. The computer-readable medium may include at least one of the following media: a computer-distributable medium, a program storage medium, a record medium, a computer-readable memory, a random access memory, an erasable programmable read-only memory, a computer-readable software distribution package, a computer-readable signal, a computer-readable telecommunications signal, computer-readable printed matter, and a computer-readable compressed software package.

SHORT DESCRIPTION OF THE DRAWINGS

The present invention will become more fully understood from the detailed description given herein below and the accompanying drawings which are given by way of illustration only, and thus are not limitative of the present invention, and wherein:

FIG. 3 shows an uplink (UL) scheduling algorithm according to the invention.

FIG. 4 shows a downlink (DL) scheduling algorithm according to the invention.

DETAILED DESCRIPTION OF THE INVENTION

Figure 1:
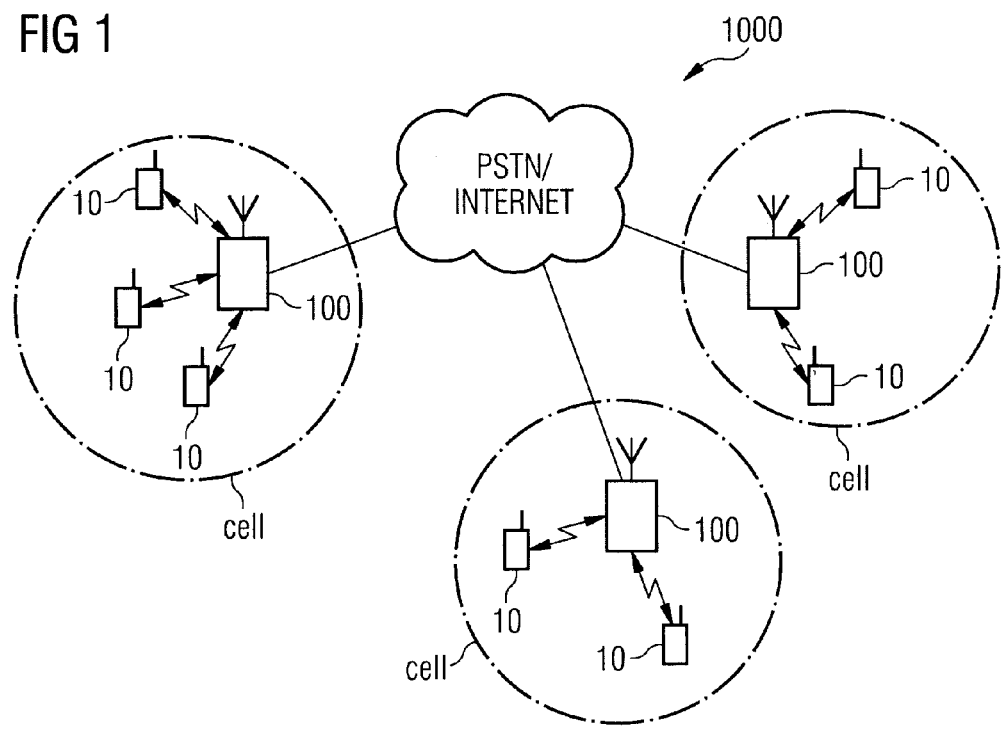
FIG. 1 depicts a current radio communications system wherein the invention can be implemented.

FIG. 1 depicts a radio communications system 1000 wherein the invention can be implemented. Radio communications system 1000 comprises of a number of ANs 100 which divide system 1000 into cells and a plurality of UEs 10. Within each cell, every UE 10 present within the cell will be served by the AN 100 that controls the cell.

Figure 2:
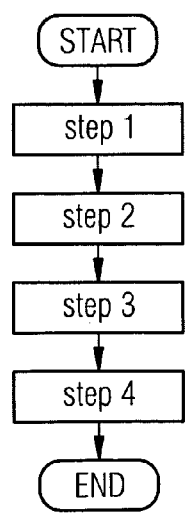
FIG. 2 depicts the steps of the invention in the form of a flow chart diagram.

FIG. 2 depicts the steps executed by the invention for scheduling transmissions of a plurality of user equipments 10 in a radio communications system 1000 in the form of a flow chart diagram.

In step 1, at least two user equipments 10 of said plurality, transmit channel information to an access node 100, access node 100 serving the at least two user equipments 10, wherein the channel information comprises of a channel matrix. In step 2, the access node 100 upon reception of the channel information, determines a correlation between said at least two user equipments 10. In step 3, the access node 100 compares the determined correlation to a threshold, and in step 4, the access node 100 schedules radio resources for the at least two user equipments 10 based on the comparison. The radio resources scheduled are divided into blocks.

In a further refinement of the method, when the correlation is equal to the threshold or higher than the threshold, the at least two user equipments 10 are scheduled by the access node 100 to use the same radio resources. Furthermore, when the correlation is lower than the threshold, the at least two user equipments are scheduled by the access node 100 to use different radio resources.

In step 2, the correlation is determined by using subspace analysis spanning the channel matrices. Furthermore it is determined for an uplink channel and/or a downlink channel of the at least two user equipments 10. The subspace analysis is applied to rows and to columns of the channel matrices.

In more detail, each matrix has two subspaces one for the column space and one for the row space. For downlink (DL) scheduling the row space can be used while for uplink (UL) scheduling the column space can be used.

The channel matrix has a dimension equal to:

$$N_R * N_T$$

Where $N_R$ is the number of receiving antennas and $N_T$ is the number of transmitting antennas.

For the UL now $N_R > N_T$ as the AN 100 has more receiving antennas. The channel matrix has $N_R$ elements in each column. Therefore the space spanned by each column has a higher dimension and thus more information than in the row space. The same applies for the DL. In this manner, the subspace dimensionality is equal to the number of antennas of AN 100.

Accordingly, the method can be applied to both row space or column space analysis. When two UEs 10 have a low interference between them, the differences between the two UEs 10 channel matrices, H(j) and H(i) respectively, are large. This means that the distance between the two subspaces spanned by the two UEs 10 channel matrices, H(j) and H(i) respectively, are large. Based on matrix analysis, the distance between the subspaces of two matrices can be measured by orthogonal projection and then, the orthogonal projection can be correlated to singular value decomposition (SVD) via signal processing.

When the rank of the matrices is the same, i.e. $\text{rank}(H(j)) = \text{rank}(H(i)) = r$, the distance between the column space of H(j) and H(i) is:

$$\|U(i)_r U(i)_r^H - U(j)_r U(j)_r^H\|_F$$

Similarly, the distance between the row space of H(j) and H(i) is:

$$\|V(i)_r V(i)_r^H - V(j)_r V(j)_r^H\|_F$$

Where, U and V are respectively left and right singular matrices of H. U, and V, are $N_R r$ and $N_T r$ matrices separately formed by the first r columns of U and V respectively.

When the rank of the matrices does not hold, $$\text{i.e. } \text{rank}(H(j)) \neq \text{rank}(H(i))$$

then the first min (rank (H(i)), rank (H(j))) number of singular vectors in U and V forming $U_{min}$ and $V_{min}$ are selected. The distance then between the row space of H(j) and H(i) is:

$$\|V(i)_{min} V(i)_{min}{}^H - V(j)_{min} V(j)_{min}{}^H\|_F$$

While the distance then between the column space of H(j) and H(i) is:

$$\|U(i)_{min} U(i)_{min}{}^H - U(j)_{min} U(j)_{min}{}^H\|_F$$

The determined subspace distance is then correlated as mentioned above and then compared to a threshold ($\epsilon$) in step 3. This threshold can be set by a system operator and provided to AN 100 during an initialization phase of the AN 100 or it can be provided during periodic system updates by the radio communications system 1000.

For the UL, as mentioned above, if any of the two UE's column space is larger or equal to the threshold ($\epsilon$), AN 100 can then schedule the UE into the same resource (frequency-time) block. For the DL, as mentioned above, if any of the two UE's row space is larger or equal to the threshold ($\epsilon$), AN 100 can then schedule the UE into the same resource (frequency-time) block.

FIGS. 3 and 4, respectively show, examples of the algorithm for an UL and a DL, corresponding to steps 2, 3 and 4 of the inventive method:

UL Scheduling Algorithm

```
For i = user 1 : user M
    { apply SVD;
      arrange the singular values in descending order;
      arrange the right singular vectors accordingly;
    }
For any two users i , j
    { set r_min = min(rank(H(i)); rank(H(j)));
      calculate ||U(i)_min U(i)^H_min − U(j)_min U(j)^H_min ||_F
      If ||U(i)_min U(i)^H_min − U(j)_min U(j)^H_min ||_F ≥ ε
         {put user i, j into one resource (frequency-time) block;}
      else
         {put user i, j into different resource (frequency-time) blocks;}
    }
```

DL Scheduling Algorithm

```
For i = user 1 : user M
    { apply SVD;
      arrange the singular values in descending order;
      arrange the left singular vectors accordingly;
    }
For any two users i , j
    { set r_min = min(rank(H(i)); rank(H(j)));
      calculate ||V (i)_min V(i)^H_min − V(j) _min V(j)^H_min ||_F
      If ||V (i)_min V(i)^H_min − V(j) _min V(j)^H_min ||_F ≥ ε
         {put user i, j into one resource (frequency-time) block;}
      else
         {put user i, j into different resource (frequency-time) blocks;}
    }
```

Figure 5:
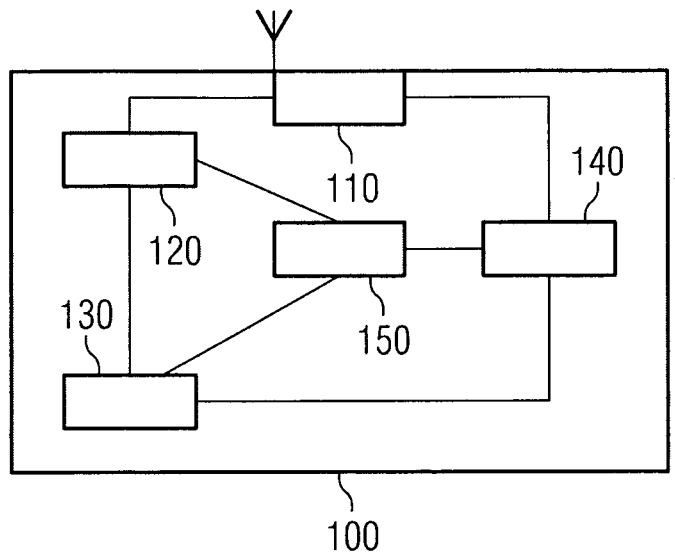
FIG. 5 depicts, a block diagram of an apparatus implementing the proposed invention.

FIG. 5 shows a block diagram of an access node 100 implementing the proposed invention. The access node 100 implementing the proposed invention can be at least one of the following: a base station, a radio network controller, a base station controller, a nodeB, an eNB.

Access node 100 has means that are adapted for scheduling transmissions of a plurality of user equipments 10, in a radio communications system 1000 and comprises of: transceiver means 110 that are adapted to receive channel information transmitted by at least two user equipments 10, of said plurality, the at least two user equipments 10, being served by the access node 100, wherein the channel information comprises of a channel matrix. Transceiver means 110 are also adapted to transmit and receive other messages and/or signals in addition to receiving channel information.

Determining means 120 that are adapted to determine a correlation between the at least two user equipments 10. Comparing means 130 that are adapted to compare the determined correlation to a threshold $\epsilon$, and scheduling means 140 that are adapted to schedule radio resources for said at least two user equipments 10, based on said comparison. The radio resources are divided into blocks.

The different means mentioned herein above can be implemented, in one illustrative embodiment, as separate entities or units within access node 100 under the overall control of control means 150 that are adapted to control access node 100. In another illustrative embodiment the different means mentioned herein above can be implemented in one entity or unit under the overall control of control means 150.

The scheduling means 140 are further adapted to schedule the at least two user equipments 10, to use the same radio resources when the correlation is equal to the threshold or higher than the threshold. Furthermore, the scheduling means 140 are further adapted to schedule the at least two user equipments 10, to use different radio resources when the correlation is lower than the threshold. The determining means 120 are further adapted to determine the correlation using subspace analysis spanning the channel matrices. The determining means 120 are further adapted to apply the subspace analysis to rows and to columns of the channel matrices. Furthermore, the determining means 120 are further adapted to determine the correlation for an uplink channel and/or a downlink channel of the at least two user equipments 10.

The invention is advantageous in that it is precise, reduces the amount of calculations and feedback necessary in order to schedule transmissions within the radio communications system. It can be applied in both the UL and DL directions allowing for a more efficient use and allocation of the available radio resources when scheduling transmissions and is applicable for all kinds of MIMO antenna number deployments.

Although the invention has been described in terms of preferred embodiments described herein, those skilled in the art will appreciate other embodiments and modifications which can be made without departing from the scope of the teachings of the invention. All such modifications are intended to be included within the scope of the claims appended hereto.

The invention claimed is:

1. A method, comprising:
   receiving at an access node channel information transmitted by at least two user equipments of a plurality of user equipments in a radio communications system, said access node serving said at least two user equipments, wherein said channel information comprises of a channel matrix;
   determining, by said access node upon reception of said channel information, a correlation between said at least two user equipments, wherein said correlation is determined using subspace analysis spanning the channel matrices of the at least two user equipments, and the subspace analysis is applied to rows and to columns of the channel matrices;

comparing, by said access node, said determined correlation to a threshold; and scheduling, by said access node, radio resources for said at least two user equipments based on said comparison.

2. The method according to claim 1, wherein when said correlation is equal to said threshold or higher than said threshold, the at least two user equipments are scheduled by said access node to use the same radio resources.

3. The method according to claim 1, wherein when said correlation is lower than said threshold, the at least two user equipments are scheduled by said access node to use different radio resources.

4. The method according to claim 1, wherein said radio resources are divided into blocks.

5. The method according to claim 1, wherein said correlation is determined for at least one of an uplink channel and a downlink channel of said at least two user equipments.

6. The method according to claim 1, wherein the channel matrix has a two subspaces, one subspace being a column space and the other subspace being a row space, and has $N_R*N_T$ dimension, where $N_R$ is a number of receiving antennas and $N_T$ is a number of transmitting antennas, and wherein said radio resources are scheduled so that the row space of the channel matrix are used for downlink scheduling and the column space of the channel matrix are used for uplink scheduling.

7. An apparatus, comprising:
one or more processors; and
one or more memories including computer program code, the one or more memories and the computer program code configured to, with the one or more processors, cause the apparatus to perform at least the following:
receive channel information transmitted by at least two user equipments of a plurality of user equipments in a radio communications system, said at least two user equipments being served by said apparatus, wherein said channel information comprises a channel matrix;
determine a correlation between said at least two user equipments, wherein said correlation is determined using subspace analysis spanning the channel matrices of the at least two user equipments, and the subspace analysis is applied to rows and to columns of the channel matrices;
compare said determined correlation to a threshold; and
schedule radio resources for said at least two user equipments based on said comparison.

8. The apparatus according to claim 7, wherein the at least two user equipments are scheduled to use the same radio resources when said correlation is equal to said threshold or higher than said threshold.

9. The apparatus according to claim 7, wherein the at least two user equipments are scheduled to use different radio resources when said correlation is lower than said threshold.

10. The apparatus according to claim 7, wherein said correlation is determined for at least one of an uplink channel and a downlink channel of said at least two user equipments.

11. The apparatus according to claim 7, wherein said apparatus is at least one of the following: a base station, a radio network controller, a base station controller, a nodeB, an eNB.

12. The apparatus according to claim 7, wherein said radio resources are divided into blocks.

13. The apparatus according to claim 7, wherein the channel matrix has a two subspaces, one subspace being a column space and the other subspace being a row space, and has $N_R*N_T$ dimension, where $N_R$ is a number of receiving antennas and $N_T$ is a number of transmitting antennas, and wherein said radio resources are scheduled so that the row space of the channel matrix are used for downlink scheduling and the column space of the channel matrix are used for uplink scheduling.

14. A computer program product comprising a non-transitory computer-readable storage medium bearing computer program code embodied therein for use with a computer, the computer program code comprising:
code for receiving channel information transmitted by at least two user equipments of a plurality of user equipments in a radio communications system, said at least two user equipments being served by an access node, wherein said channel information comprises a channel matrix;
code for determining a correlation between said at least two user equipments, wherein said correlation is determined using subspace analysis spanning the channel matrices of the at least two user equipments, and the subspace analysis is applied to rows and to columns of the channel matrices;
code for comparing said determined correlation to a threshold; and
code for scheduling radio resources for said at least two user equipments based on said comparison.

15. The computer program product according to claim 14, wherein the at least two user equipments are scheduled to use the same radio resources when said correlation is equal to said threshold or higher than said threshold.

16. The computer program product according to claim 14, wherein the at least two user equipments are scheduled to use different radio resources when said correlation is lower than said threshold.

17. The computer program product according to claim 14, wherein said correlation is determined for at least one of an uplink channel and a downlink channel of said at least two user equipments.

18. The computer program product according to claim 14, wherein said access node is at least one of the following: a base station, a radio network controller, a base station controller, a nodeB, an eNB.

19. The computer program product according to claim 14, wherein said radio resources are divided into blocks.

20. The computer program product according to claim 14, wherein the channel matrix has a two subspaces, one subspace being a column space and the other subspace being a row space, and has $N_R*N_T$ dimension, where $N_R$ is a number of receiving antennas and $N_T$ is a number of transmitting antennas, and wherein said radio resources are scheduled so that the row space of the channel matrix are used for downlink scheduling and the column space of the channel matrix are used for uplink scheduling.

* * * * *